United States Patent
Shelepov

(10) Patent No.: US 11,507,691 B2
(45) Date of Patent: Nov. 22, 2022

(54) FILE SYSTEM FOR PERSISTING DATA PRIVACY

(71) Applicant: Meta Platforms Technologies, LLC, Menlo Park, CA (US)

(72) Inventor: Bulat Shelepov, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 233 days.

(21) Appl. No.: 16/849,557

(22) Filed: Apr. 15, 2020

(65) Prior Publication Data

US 2021/0326472 A1 Oct. 21, 2021

(51) Int. Cl.
*G06F 21/00* (2013.01)
*G06F 21/62* (2013.01)
*G06F 16/176* (2019.01)
*G06F 21/60* (2013.01)
*G06F 16/11* (2019.01)

(52) U.S. Cl.
CPC ........ *G06F 21/6245* (2013.01); *G06F 16/122* (2019.01); *G06F 16/176* (2019.01); *G06F 21/602* (2013.01)

(58) Field of Classification Search
CPC .. G06F 21/6245; G06F 16/122; G06F 16/176; G06F 21/602
See application file for complete search history.

(56) References Cited

U.S. PATENT DOCUMENTS

| | | | |
|---|---|---|---|
| 9,298,931 B2 * | 3/2016 | Ur | G06F 21/6245 |
| 10,154,007 B1 * | 12/2018 | Viswanathan | H04L 63/20 |
| 10,574,704 B1 * | 2/2020 | Flowerday | H04W 12/02 |
| 10,706,167 B1 * | 7/2020 | Sokolov | G06F 21/6218 |
| 2003/0233544 A1 * | 12/2003 | Erlingsson | G06F 21/6218 713/167 |
| 2011/0225293 A1 * | 9/2011 | Rathod | G06Q 30/0269 709/224 |
| 2012/0110680 A1 * | 5/2012 | Oliver | H04L 63/102 726/30 |
| 2013/0305379 A1 * | 11/2013 | Udani | G06F 21/51 726/26 |
| 2014/0129942 A1 * | 5/2014 | Rathod | H04N 21/44226 715/720 |
| 2015/0074409 A1 * | 3/2015 | Reid | G06F 21/6218 713/171 |
| 2015/0156217 A1 * | 6/2015 | Biswas | G06F 3/015 726/1 |

(Continued)

*Primary Examiner* — Shin-Hon (Eric) Chen
(74) *Attorney, Agent, or Firm* — Baker Botts L.L.P.

(57) ABSTRACT

In one embodiment, a file system of a computing device may receive from a first application a write request to write a file to a storage device of the computing device. The request may include a privacy preference for the file. In response to the write request, the file system may generate privacy metadata corresponding to the privacy preference, associate the privacy metadata to the file, and write the file and the associated privacy metadata to the storage device. The file system may receive from a second application a read request to read the file from the storage device. In response to receiving the read request, the file system may provide the second application access to the file and the associated privacy metadata. The privacy metadata can be configured to be used by the second application to select a distribution policy for the file.

16 Claims, 7 Drawing Sheets

(56) References Cited

U.S. PATENT DOCUMENTS

| | | | |
|---|---|---|---|
| 2016/0253509 A1* | 9/2016 | Wibran | G06F 21/6209 |
| | | | 726/1 |
| 2016/0277374 A1* | 9/2016 | Reid | H04L 63/0435 |
| 2016/0373515 A1* | 12/2016 | Jagad | H04N 21/8586 |
| 2017/0041391 A1* | 2/2017 | Vasyutynskyy | H04L 67/1097 |
| 2017/0187749 A1* | 6/2017 | Tyler | H04L 63/0407 |
| 2018/0206115 A1* | 7/2018 | Pistoia | G06F 21/6245 |
| 2019/0069121 A1* | 2/2019 | Kulkarni | H04W 4/50 |
| 2019/0205056 A1* | 7/2019 | Halstuch | G06F 16/122 |
| 2021/0089675 A1* | 3/2021 | Gkoulalas-Divanis | |
| | | | G06F 21/6227 |
| 2021/0089678 A1* | 3/2021 | Gkoulalas-Divanis | |
| | | | G06F 21/6272 |
| 2021/0135943 A1* | 5/2021 | Andrews | H04L 41/0893 |

\* cited by examiner

FILE SYSTEM FOR PERSISTING DATA PRIVACY

TECHNICAL FIELD

This disclosure generally relates to an enhanced privacy feature of a file system of an operating system.

BACKGROUND

An operating system of an application—such as a camera, phone, augmented reality glasses—may include a file system for writing a file to a storage device or unit. With such applications, a user may have the file system upload, save, or share data to other users, and with social-networking applications, users may connect, communicate, and share data with other users in their social networks. Depending on the context of the application, the user may desire the application to constantly capture data to provide just-in-time information or assistance. Due to user error, the user may have the file system export sensitive or private data to other users.

SUMMARY OF PARTICULAR EMBODIMENTS

In particular embodiments, a file system may generate and associate privacy metadata to a file, and write the file and its associated metadata to a storage device to maintain a user's privacy with respect to the file. The privacy metadata can persist the user's privacy preferences, thereby enabling applications accessing the file and its data to make appropriate decisions regarding file sharing based on those privacy preferences, which can prevent accidental uploads or sharing of the user's sensitive or private data. As an example and not by way of limitation, a user using an augmented reality or virtual reality application may accidentally capture sensitive or private data in the user's environment. The file system can generate and associate privacy metadata to the captured data when it is detected to contain sensitive or private information, which can prevent accidental sharing of the captured data containing the sensitive or private information.

In particular embodiments, a file system of a computing device may receive from a first application executing on the computing device a write request to write a file to a storage device of the computing device. The request may include a privacy preference for the file. In response to the write request, the file system can generate privacy metadata corresponding to the privacy preference, associate the privacy metadata to the file, and write the file and the associated privacy metadata to the storage device. The file system can receive from a second application executing on the computing device a read request to read the file from the storage device. In response to receiving the read request, the file system can provide the second application access to the file and the associated privacy metadata. The privacy metadata can be configured to be used by the second application to select a distribution policy for the file.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

This application describes an improved file system designed to persist the privacy preferences of a user's data, thereby enabling applications accessing the data to make appropriate decisions based on those privacy preferences. One example method of maintaining the privacy of a user's data and files is to have a file system of a computing device associate privacy metadata to a file and writing it to a storage device, so future reads of the file will include the privacy metadata that dictate how the file should be uploaded, shared, or distributed. Maintaining the privacy of a user's data and files can reduce accidental uploading or sharing of sensitive or private data. Privacy is particularly important in augmented reality (AR) and virtual reality (VR) environments, where sensitive or private data may be captured in a user's natural environment.

Data Privacy

A user may desire an application, particularly an AR and VR application, to capture or record data of the user's environment to provide the user with useful or beneficial information. The user may desire information they can use to interact with other users or to interact in their environment. For example, the user may run into another user, and the AR application can automatically pull up the other user's contact information. This can be particularly useful if both users are in a workplace setting and would like to share each other's contact information, and the AR application can instantly share information about how to contact one another. As another example, the user may desire that the VR application scan the user's environment to alert the user of impending hazards or obstacles, as the user's vision may be blocked by the VR application headset.

Other forms of data such as diagnostic data can be generated, for example, on an operating system on the user's device. Diagnostic data (e.g., system logs, trace files, full or partial memory dumps, etc.) can include personally identifiable information (PII) and other highly sensitive information (e.g., in-memory passwords, encryption keys, cached fragments of file). This data can be routinely uploaded to a software or device manufacturer, and thus can be prone to unintended access by contractors and vendors. The user may desire other forms of data such as diagnostic data be safeguarded.

Figure 1:
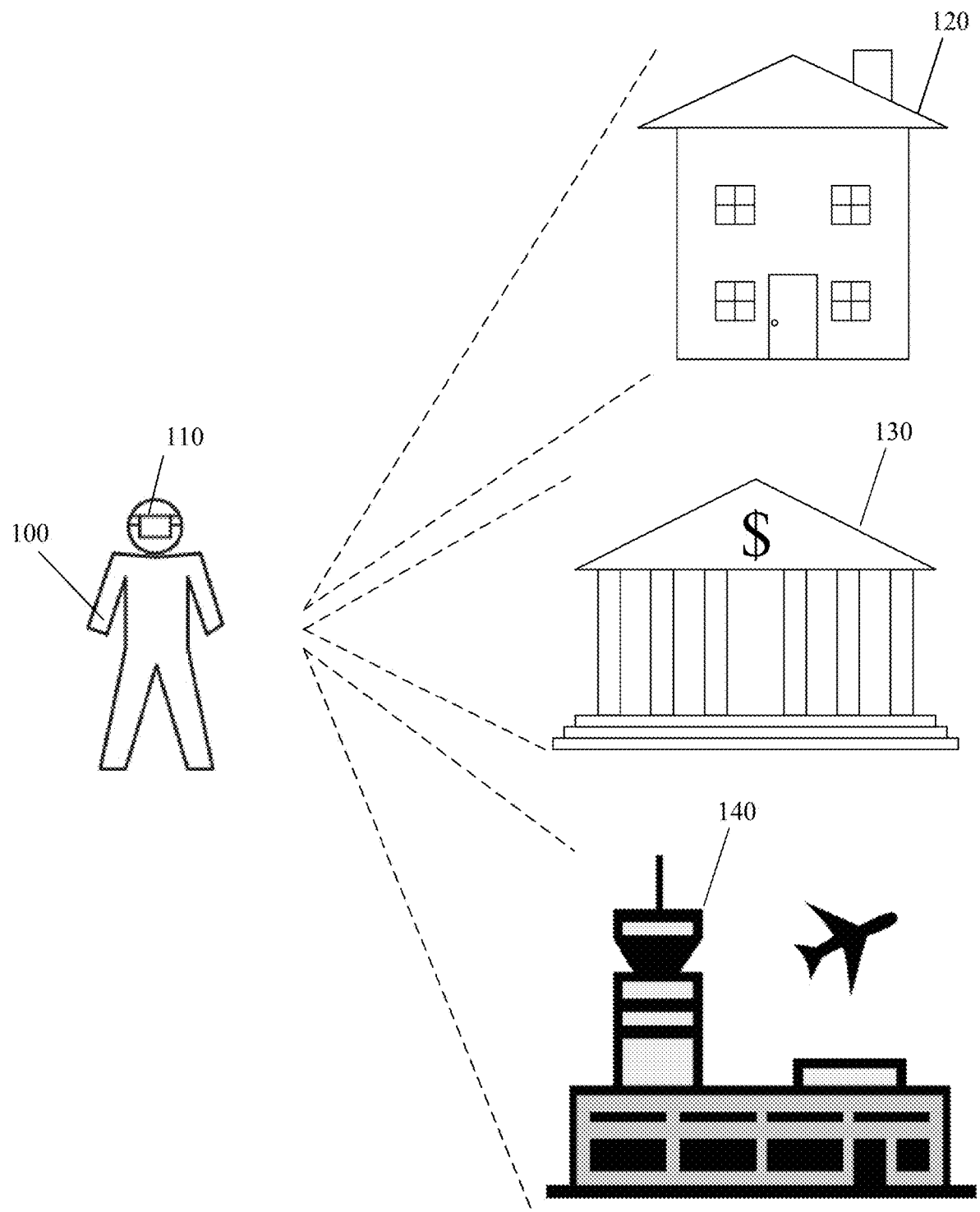
FIG. 1 illustrates example environments where privacy may or may not be preferred.
Figure 2:
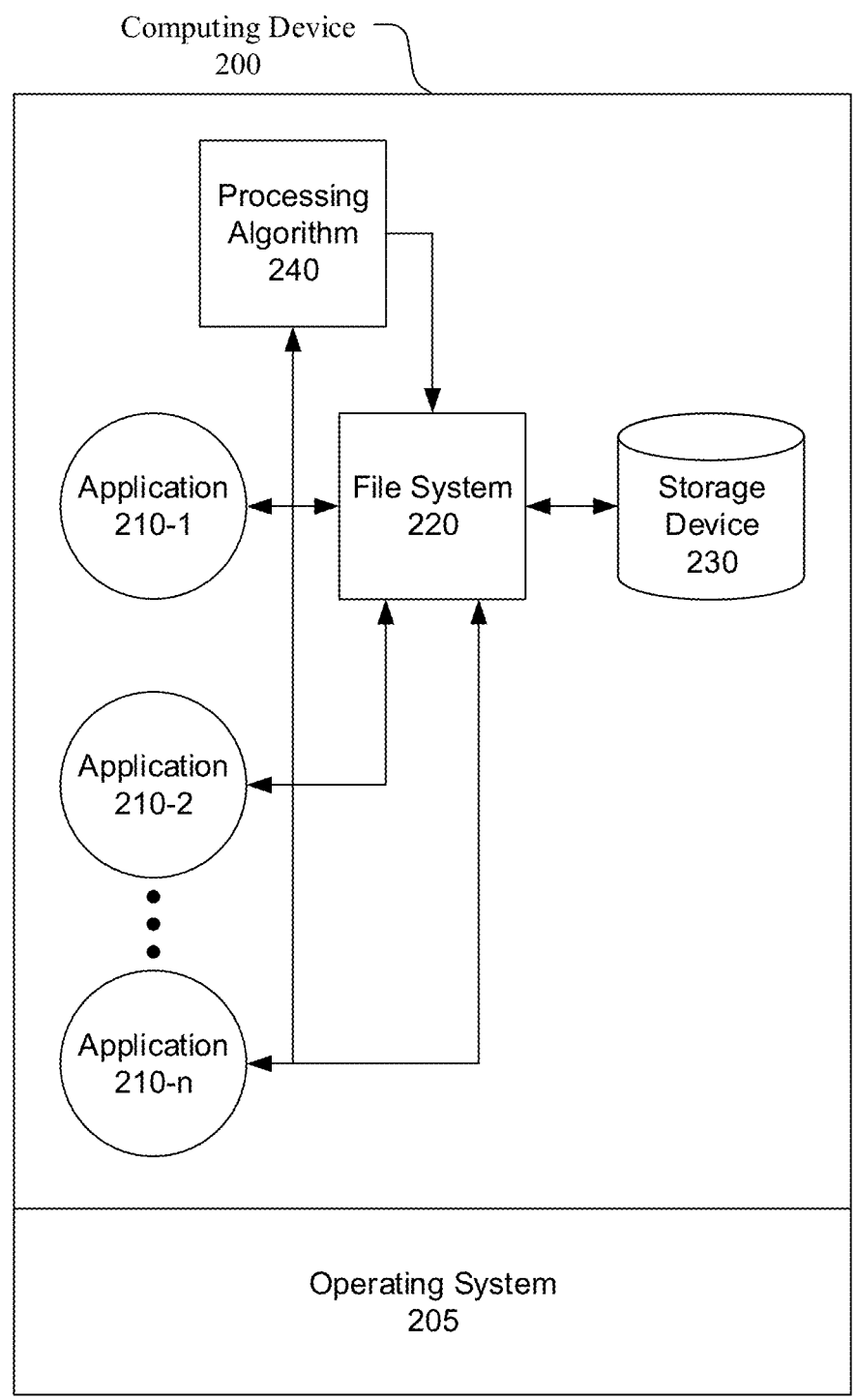
FIG. 2 illustrates an example computing device with a file system to maintain privacy of data and files.
Figure 3A:
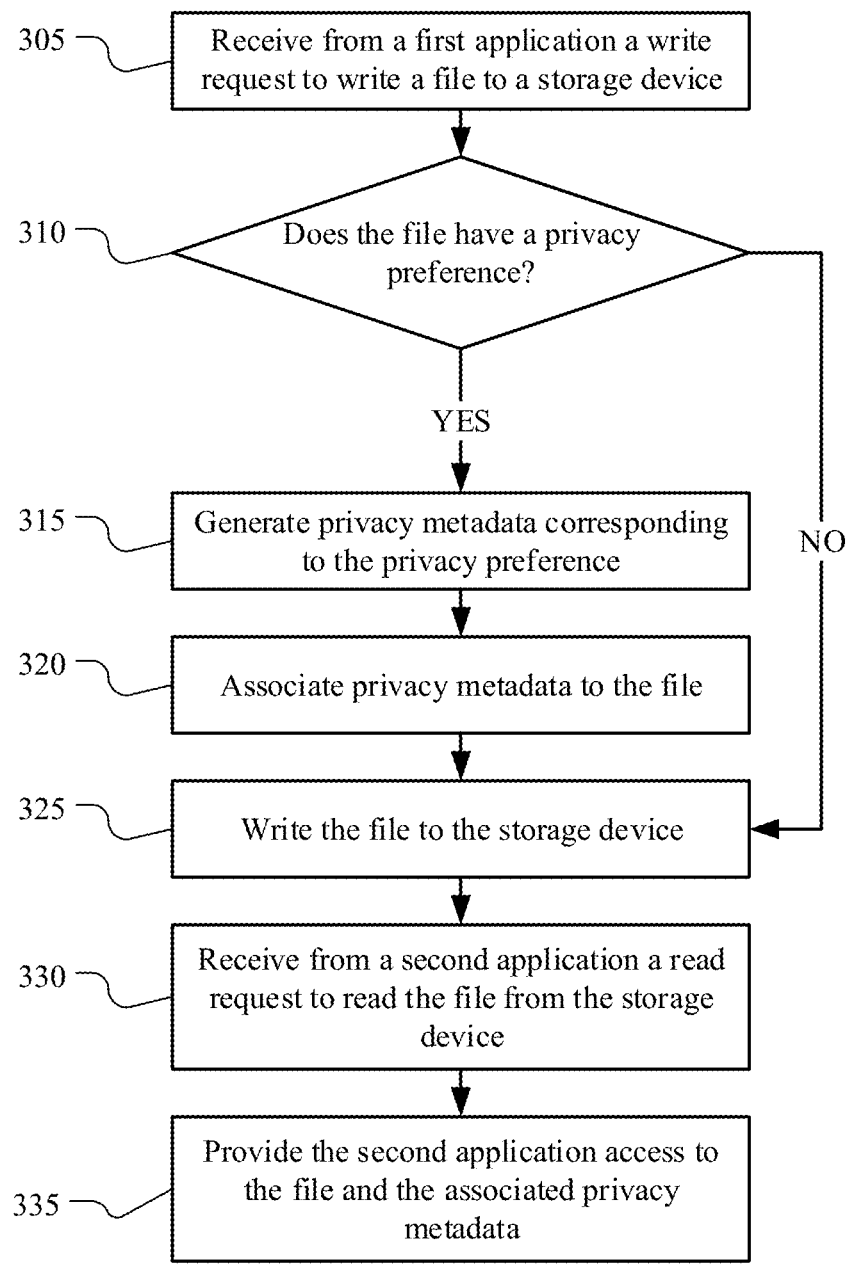
FIG. 3A illustrates an example method for using a file system to maintain privacy of data and files.
Figure 3B:
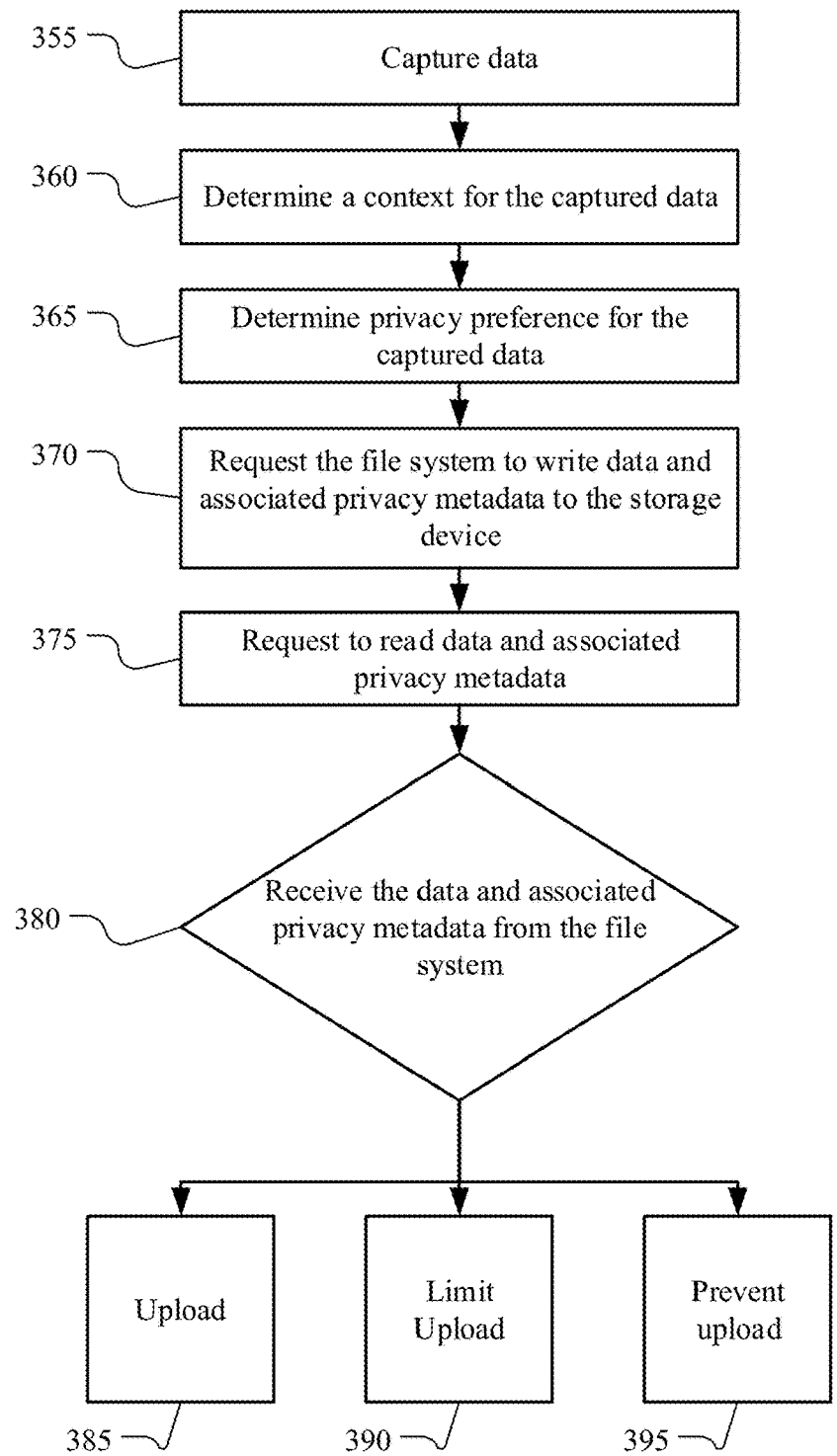
FIG. 3B illustrates an example method of an application using a file system to write and retrieve files to and from a storage device.

The discussion of maintaining a user's data privacy using a file system will focus on the embodiments shown in FIGS. 1 and 2, and the method described in FIGS. 3A and 3B. Briefly, FIG. 1 illustrates three example environments 120, 130, 140 where privacy may or may not be preferred. FIG. 2 illustrates an example computing device 200 with a file system 220 configured to maintain privacy of data and files. FIG. 3A illustrates an example method 300 for using a file system to maintain privacy of data and files. FIG. 3B illustrates an example method of an application using a file system to write and retrieve files to and from a storage device.

FIG. 1 illustrates three example environments 120, 130, 140, where a user 100 has a privacy preference for data or files recorded in environments 120, 130, but perhaps has no privacy preference for data or files recorded in environment 140. The user 100 can have a device 110 (e.g., augmented reality glasses, a smart watch, a smartphone, etc.) which has a camera, video recorder, microphone, location sensor, keyboard, NFC reader, or any other types of sensor that can constantly or continuously generate files or data regarding or involving the user 100's environment. For example, the user 100 can enter environment 120 (e.g., a private home) where the user 100 expects privacy. The device 110 can have an application executed by a processor (discussed in detail below) that recognizes one or more features of the environment 120 that indicate it contains or is likely to contain sensitive or private data. For example, image captures of the environment 120 may include a "welcome home" doormat. A computer vision algorithm (e.g., a machine-learning model trained to classify objects captured in images) may process the captured images and detect the doormat. As another example, audio captures of the environment 120 may include a doorbell ring or an oral "I'm home" by the user 100. A computer audio algorithm (e.g., a machine-learning model trained to classify audio recordings) may process the captured audio and detect the doorbell ring or "I'm home" announcement by the user 100. As another example, a location sensor (e.g., GPS) can detect the user 100 is in a residential area, or is at their private home (e.g., where the user 100 marked their home address on a map). A location algorithm (e.g., a machine-learning model trained to classify location and GPS data) may process the captured location information and detect the user 100 is in a private home environment. Based on such determination, the application may indicate that the user 100 is about to enter a private home where the use desires heightened privacy and, consequently, ask the file system of the device 100 to tag the data (e.g., the photo file, video file, or audio file of the user 100 in the private home) as private according to the user 100's privacy criteria. In some implementations, files or data can be copied from another location (e.g., existing files copied from memory locations or via network communication). In some implementations, files or data can be generated by computation (e.g., data generated by the operating system of the device 110).

As another example, the user 100 can enter an environment 130 (e.g., a bank) where the user 100 still expects privacy, but perhaps to a lesser degree as the environment 120 (e.g., the restroom from the environment 120). For example, the user 100 may expect privacy while the user 100 is at the teller or is meeting with a banker discussing the user's private financial information, but the user 100 does not expect privacy in the bank lobby of the environment 130. An application executed by a processor of the device 110 can recognize when the user 100 expects privacy due to the presence of sensitive or private data (e.g., the device 110 recognizes the user 100 is writing a deposit slip containing bank account numbers, is at an ATM, or is speaking with a banker about the user 100's financials), and the application can also recognize when the user 100 does not expect privacy as there is no sensitive or private data around (e.g., the user is only inside the bank lobby). The application can then request the file system of the device 110 to tag portions of the captured data (e.g., when the user is speaking with a banker) as private, and not tag other portions of the captured data as private (e.g., when the user is only standing in the lobby).

As another example, the user 100 can enter an environment 140 (e.g., a public area such as a public park or an airport terminal) where the user 100 has no expectation of privacy. For example, the user 100 may not expect privacy because a public park activity, such as a picnic, is not associated with any private or sensitive information, or an airport terminal is far too congested to conduct any private or sensitive action. An application on the device 110 can recognize when the user 100 does not expect privacy due to the lack of sensitive or private data (e.g., the device 110 recognizes the user 100 is sitting at an airport gate next to a boarding plane and detects no sensitive or private data around). The application may not tag the data (e.g., photo file, video file, or audio file of the user 100 in the airport terminal from the recording) as private according to the user 100's privacy criteria.

FIG. 2 illustrates an example computing device 200 with a file system 220 configured to maintain privacy of data and files from one or more applications 210. The computing device 200 includes one or more applications 210—a first application 210-1, a second application 210-2, and a subsequent application 210-n—which run on an operating system 205 of the computing device 200. The computing device can be an AR/VR device, smart device, mobile phone, tablet, laptop, computer, camera, or other device. The application 210 can be, for example, a camera application, microphone application, software application, web browser, social media application, AR or VR application, or other application that collects, creates, gathers, or otherwise has files that may contain sensitive or private data. The application 210 is connected to the file system 220. The application 210 can send to the file system 220 a write request to write a file to the storage device 230. The write request can be performed by an application programming interface (API) that requests a file write that includes a privacy preference for the file, which can trigger the file system 220 to associate privacy metadata with the file (discussed in detail below). Alternatively, an API can request a file write with no request to include a privacy preference for the file, if the file does not contain sensitive or private data. The file can be sent to the file system 220 over multiple separate or incremental write requests. For example, a first write request can be a "create request," and any subsequent write requests may have additional privacy preferences for the file that can update or "tighten" the privacy preferences for the entire file. If, for example, the write request comes from a file that is copied from a second location (e.g., memory location or via network communication), the privacy preferences for the file can also be copied from the second location. The files can be documents, audio, photos, videos, and diagnostic data, among other things, that may include sensitive or private data that, for example, are inadvertently recorded or documented. For example, the file can be a video stream used in an AR video that recorded a copy of sensitive financial documents inadvertently left in the recording environment, or includes a sensitive or private conversation such as one between a client and a doctor. The application 210 (e.g., a camera) can record a video, and the application 210 can request the video be written to and stored on the storage disk 230. The file system 220 (e.g., ext4 or NTFS) can serve as index or database containing the location of data on the storage device 230, as well as a system to write the files to the storage device 230. Beyond just storing files, the file system 220 can store information about the files, such as file size, file location, and file attributes. Further, the file system 220 can introduce attributes to the file, such as metadata. Specifically, and as will be discussed in detail below, the file system 220 can generate and associate privacy metadata with a file received from the application 210 prior to writing the file to the storage device 230. The file system 220 can generate and associate privacy metadata with a file if the write requests includes a privacy preference, discussed in detail below.

Referring to FIGS. 1 and 2, the application 210 can determine a privacy preference for the file, and the file system 220 can receive the privacy preference for the file via the write request. The application 210 can determine the privacy preference based on privacy criteria. Privacy criteria can be used to determine privacy preferences by determining what files the user 100 may like to keep private. The user 100 may like to keep files private if the files contain sensitive information or material, if the user 100 would be embarrassed if the files were made public, or for any other reason that the user 100 would prefer to keep the files private. For example, a file containing financial information (e.g., credit card numbers, discussions with a banker about personal finances), personal moments, health issues, work or legal matters, family affairs, log data (e.g., data from a wearable device, monitoring device, or tracking device), or any other file that the user 100 would deem to be private would then satisfy the privacy criteria that the application 210 would use to determine a privacy preference for the file. In some implementations, privacy criteria can be determined by the user 100's preferences, for example, if the user 100 marks the file as private. If the user 100 has a camera that is continuously recording and the user 100 is in a public place such as an airport (the environment 140), and then the user 100 has a private conversation with another user, the user 100 can manually tag or mark the file as private (e.g., by a command: "camera, mark this conversation as private"). In some implementations, privacy criteria can be determined by the application 210. For example, if the user 100 is speaking with another user in a public place (e.g., the environment 140) but a camera (e.g., the device 110) detects the user 100 is discussing a private issue such as personal finances with the other user, the camera can then mark this conversation portion of the recorded video as private. That is, the privacy criteria can mark this conversation with the other user as private, and the application 210 can determine a privacy preference that corresponds to the privacy criteria. As another example, if the user 100 is entering a bathroom (the environment 120), the user 100 can manually mark this event as private, or the application 210 can detect the activity of using the restroom as private, causing the application 210 to attach a privacy preference for the file.

Referring to FIG. 2, the privacy preference can be a standard set of privacy preferences, e.g., a set of privacy preference options that are defined by the file system 220 and/or by the application 210. For example, the privacy preference can determine whether the user would desire a file to be shared with everyone, with friends of friends, with friends, or with no one. The file system 220 and/or the application 210 can define privacy preferences using flags such as "highly sensitive" (do not share), "moderately sensitive" (share with friends or friends of friends), or "not sensitive" (share with everyone). The privacy preference can also be a user-defined set of privacy preferences. For example, the user can define a first group of other users as "family" and a second group of other users as "friends," and allow the "family" group to access more private files or data than the "friends" group. In other words, the privacy preference can be explicitly selected by the user. In some implementations, the user's privacy preferences can automatically be determined or inferred based on contextual clues, e.g., clues taken from the environment of the file. Contextual clues can be audio, image, location, or other data in the file that indicate whether the user is or is not in a sensitive or private setting. The files received from the application 210 can be scanned for contextual clues to detect whether the file contains sensitive or private data to automatically determine the privacy preference to be associated with the file. For example, a GPS location of where the file was created can be used to determine if the file was created in a sensitive or private environment. As another example, the privacy preference for a photo taken at a public park may indicate the photo can be shared with everyone, whereas the privacy preference for a video recording of the user at a dinner party with friends may indicate the video can be shared only with friends, or with friends of friends. As another example, the privacy preference for an audio recording of the user talking with his banker may be shared with no one. Such privacy preferences can inform to the file system 220 what level of privacy metadata is required for each file (discussed in detail below). In some implementations, the privacy preference can be copied or inherited. For example, a file with a privacy preference that is copied or modified from one location to another will retain its privacy preference. In some implementations, the privacy preference is determined based on the source of the file. For example, all files from a sensitive, private, or otherwise confidential domain can be deemed sensitive. For example, files from a mobile banking application can be deemed sensitive. As another example, all data and files coming from a secure memory enclave can be determined to be sensitive. If the user makes an online purchase and enters a credit card number on a browser application, the browser application can automatically determine the corresponding data to be private or sensitive. The browser application can allocate memory with a privacy tag to store the credit card information, so if the browser application crashes a memory minidump can be written to a disk, the file system 220 can automatically upgrade the privacy preference for the data. Alternatively, if the file has no privacy preference, then the file can be written to the storage device 230 with no privacy metadata. In some implementations, privacy preferences can be applied to file ranges. For example, a privacy preference can be applied to a particular timespan in an audio or a video recording when the user desires the entire portion of the audio or video recording to be marked as private, on top of marking discrete portions of the recording as private.

In some implementations, a processing algorithm 240 can be configured to detect sensitive or private data accompanying a write request. The processing algorithm 240 can be triggered when the application 210 sends a write request to the file system 220. In particular embodiments, when the application 210 requests the file system 220 to write the file to the storage device 230, the application 210 may invoke the processing algorithm 240 (e.g., it may be stored as a software library) to determine the likely privacy or sensitivity level of the file. Alternatively, the processing algorithm 240 can be integral to the file system 220 such that every write request received by the file system 220 from the application 210 is processed by the processing algorithm 240. The processing algorithm 240 can automatically determine whether a file is private if the contextual environment or data within the file itself indicates that the file should be private. The processing algorithm 240 can be configured to detect contextual clues in the file, and then analyze the contextual clues to determine whether the file contains sensitive or private data. For example, the processing algorithm 240 can automatically determine a recording to be private if the processing algorithm 240 detects a file is recorded in a private location such as a restroom, a home, a bank, or a workplace. The processing algorithm 240 can also be instructed to mark a file as private, e.g., if the user 100 provides a command that the file is private, e.g., via the user 100 command to "take a private photo, video, or audio recording." In some implementations, the processing algorithm 240 can be instructed to re-determine the privacy preferences of a file. For example, if a file is modified or edited (e.g., if a picture file is blurred or resized to omit the private or sensitive information, or a video file is edited to omit the private or sensitive information), the processing algorithm 240 can re-run on the file to determine whether the privacy preference for the file should be updated or changed. The processing algorithm 240 can include one or more of, but is not limited to, image processing algorithms, location processing algorithms, and audio processing algorithms that examine any combination of available data to determine the context in which the recorded or captured data is created. For example, with reference to FIGS. 1 and 2, the processing algorithm 240 can be an image processing algorithm such as a computer vision algorithm that detects whether the user 100 is by a "welcome home" doormat, indicating the user 100 is in a private environment 120. The processing algorithm 240 can also be a location processing algorithm that uses a GPS sensor to detects whether the user 100 is in a private environment such as environment 120 (e.g., a private home where privacy is expected) or a non-private environment such as environment 140 (e.g., an airport where privacy is not expected). The processing algorithm 240 can be an audio processing algorithm such as a computer audio algorithm or machine-learning model trained to identify when an audio signal is taken in a private or public setting. For example, the audio processing algorithm can detect an audio signal, e.g., the user 100 entering the environment 120 (e.g., a private home) and stating, "I'm home," or entering the environment 130 (e.g., a bank) and asking a teller "I would like to make a withdrawal," and determine that the captured data is sensitive or private.

In some embodiments, the privacy expectation of the user 100 may change, triggering the file system 220 and/or the application 210 to alter the privacy settings of the recorded or captured data. For example, the device 110 may record or capture video data of the user 100 environment, such as the environment 140, where the user has no expectation of privacy. During the recording of the user 100 in the environment 140, the user's 100 expectation of privacy may change, e.g., the user 100 may answer a phone call and discuss a sensitive or private matter, or the user 100 may enter a sensitive or private discussion with another user. A computer audio algorithm may process the captured audio and determine, based on the recording, the user 100 may desire or expect a heightened privacy expectation, and ask the file system to upgrade the privacy metadata of the video recording from no-privacy concern to heightened privacy concern.

Referring again to FIG. 2, in response to the application 210's write request to write a file having a privacy preference for the file, the file system 220 can generate privacy metadata that corresponds to the privacy preference of the file. That is, the file system 220 can generate privacy metadata, e.g., "tags" or "rules" regarding the privacy preference of the file, which may be used to determine how the file should be handled. In particular embodiments, the privacy metadata may be generated according to the privacy preference set by application 210 (e.g., the application 210-1) in its request to write a file to the storage device 230. The privacy preference selected by the application 210 may be a custom preference defined by the application 210 or a global preference defined by the file system 220.

For a stricter privacy preference, the file system 220 can generate stricter privacy metadata which could be used to limit how the file is shared and accessed by other applications 210 (e.g., applications 210-2, . . . 210-n). Conversely, for a less strict privacy preference, the file system 220 can generate less strict privacy metadata, which may lessen the restriction on what applications 210 could do with the file. For example, the privacy metadata that corresponds to a file containing financial information will be stricter than the privacy metadata that corresponds to a file containing photos taken at a public park that lack any sensitive or private information.

After generating privacy metadata that corresponds to the privacy preference, the file system 220 associates the privacy metadata to the file. The privacy metadata can be associated with the file by being written to the file by the file system 220. That is, the file system 220 makes the privacy metadata a persisted part of the file such that the privacy metadata propagates with the file. For example, if the first application 210-1 requests the file system 220 to write a file to the storage device 230 that the file system 220 associated with privacy metadata, then the first application 210-1, the second application 210-2, and/or any subsequent application 210-n that receives the file from the storage device 230 will also receive the associated privacy metadata (discussed in more detail below).

After generating and associating the privacy metadata to the file, the file system 220 writes the file to the storage device 230. The storage device 230 can be, for example, a memory storage disk of the computing device 200. The storage device 230 can be a cloud storage system, or a storage device or system that is integrated with a cloud storage system. If the file received at the file system 220 and by the application 210 has a privacy preference, the file system 220 writes the file and the associated privacy metadata to the storage device 230. However, if the file does not include a privacy preference, then the file system 220 can write the file to the storage device 230 without generating and associating privacy metadata to the file.

In some implementations, the file system 220 encrypts the file received from the application 210 before writing it to the storage device 230. The level of encryption associated with the file and encrypted by the file system 220 can correspond to the privacy preferences of the user or the privacy metadata associated with the file. Alternatively, the file system 220 can receive from the application 210 a file that has already been encrypted by the application 210. In some implementations, upon receiving the encrypted file, the file system 220 can generate privacy metadata according to the level of encryption of the file. That is, the file system 220 can determine that an encrypted file indicates a higher privacy preference, causing the file system 220 to associate a corresponding privacy metadata to the file.

Once the file system 220 writes the file and any associated privacy metadata to the storage device 230, the file system 220 can receive from the application 210 (e.g., the first application 210-1 or the second application 210-2) a read request to read or access the file on the storage device 230. Specifically, the file system can receive the read request from the second application, for example, via an API of the file system 220. Then, the file system 220 can retrieve the file from the storage device 230. Once the file system 220 retrieves the file from the storage device 230, the file system 220 can provide the file to the application 210 (e.g., the application 210-2).

Some of the files stored in the storage device 230 may have privacy metadata generated by the file system 220 and associated with the file before it was written to the storage device 230. In particular embodiments, the file system 220 may restrict file access based on the privacy metadata. For example, if the file retrieved by the file system 220 has associated privacy metadata, then the file system 220 can provide the application 210 (e.g., the application 210-2) access to the file, but will dictate a distribution policy for the file, as discussed in detail below. However, if there is no privacy metadata associated with the file, the file system 220 can provide the application 210 (e.g., the second application 210-2) access to the file.

In particular embodiments, the privacy metadata associated with a file may be used by the application 210 accessing the file to determine what actions can and cannot be performed on the file. As discussed, when a file in the storage device 230 has privacy metadata associated with it, the privacy metadata propagates with the file. Thus, when the file system 220 retrieves from the storage device 230 a file that has associated privacy metadata, and when the file system 220 provides the file and the associated privacy metadata to the application 210 (e.g., the second application 210-2), the application 210 may use the privacy metadata associated with the file to select a distribution policy for the file. Specifically, when the privacy metadata is used to select a distribution policy for the file on the application 210, the application 210 is limited or restricted by the "tags" or "rules" regarding accessing, sharing, or distributing the file. For example, if the file system 220 saves an image file from the first application 210-1 and its associated privacy metadata to the storage device 230, and then the second application 210-2 sends a read request to the file system 220 to read the file from the storage device 230, the file system 220 can provide the image file and its associated privacy metadata to the second application 210-2. However, the privacy metadata may dictate a distribution policy for the image file, such as preventing the second application 210-2, for example, from sharing the image file to social media, or only allowing the second application 210-2 to distribute the image file among approved groups of other users. As another example, if only one image file in an album of image files contains sensitive or private data (e.g., one image file contains banking information), then the privacy metadata associated with the image file album may allow all but the one image file containing sensitive or private data to be uploaded or distributed by the second application 210-2. A benefit of such a distribution policy is that a file created by one application, e.g., the first application 210-1, may contain sensitive or private data that will be prevented from being accidentally uploaded, shared, or otherwise distributed by any application, e.g., the first application 210-1 or the second application 210-2.

In some implementations, a file containing privacy metadata that selects a distribution policy for a file can be distributed among application-defined groups. For example, distribution among application-defined groups can include distribution to everyone (e.g., in situations where there is no privacy metadata associated with the file), distribution to friends of friends, distribution to friends, or distribution to no one (e.g., in situations where there is strict privacy metadata associated with the file). In some implementations, a file containing privacy metadata that is used to select a distribution policy for a file can be distributed among user-defined groups, such as groups created by the user on the application 210. For example, a user can define a "family" group, a "friends" group, and a "work" group, where the user can distribute the most sensitive and private data to "family" group, distribute the moderately sensitive and private data to the "friends" group, and distribute only the least sensitive and private data to the "work" group.

In some implementations, the privacy metadata may automatically prevent the application 210 from uploading, sharing, or distributing files with associated privacy metadata. However, in some implementations, the application 210 may allow a user to choose whether to upload, share, or distribute the file with associated privacy metadata, by prompting the user to verify whether the user wants to distribute the file against the distribution policy selected by the privacy metadata. This can be done, for example, by having the user verify and acknowledge the distribution policy, by having the user enter a code or password to override the limits set by the distribution policy, or by having the user confirm distribution of a file following a prompt presented by the application 210 regarding the distribution policy associated with the file.

FIG. 3A illustrates an example method 300 for using a file system to write and retrieve files to and from a storage device. The method may begin at step 305, where a file system of a computing device receives from a first application executing on the computing device, a write request to write a file to a storage device of the computing device. The request can comprise a privacy preference for the file. At step 310, in response to the write request, the file system can determine whether the request comprises a privacy preference for the file. If the request does not have a privacy preference for the file, then the file system can write the file to a storage device (step 325). However, if the request does have a privacy preference for the file, at step 315 the file system can generate privacy metadata that corresponds to the privacy preference. At step 320, the file system can associate the privacy metadata generated in step 330 to the file. Then at step 325, the file system can write the file and the associated privacy metadata to the storage device. At step 330, the file system can receive from a second application executing on the computing device a read request to read the file from the storage device. At step 335, in response to the read request, the file system can provide the second application access to the file and the associated privacy metadata. Based on the associated privacy metadata, the second application can select a distribution policy for the file.

FIG. 3B illustrates an example method of an application using a file system to write and retrieve files to and from a storage device. The method may begin at step 355, where an application of a computing device records or captures data. For example, the data can be a recording of a user's environment. At step 360, the application can determine a context for the captured data. For example, the application can use a processing algorithm to analyze one or more of audio, video, location, or other form of contextual clues in a data capture. At step 365, the application can determine a privacy preference for the captured data. For example, determining the privacy preference for the captured data can be done by analyzing contextual clues in the data capture to determine detect whether the file containing the file contains sensitive or private data to automatically determine the privacy preference to be associated with the file, e.g., whether the user would desire the data to have a heightened privacy preference. At step 370, the application can request the file system to write the data and any associated privacy metadata to the storage device. When the data and any associated privacy metadata is written to the storage device, then at step 375 the application can request to read the data and any associated privacy metadata. For example, the application can send a request to the file system to transmit to the application the data and associated privacy metadata. At step 380, the application can receive the data and the associated privacy metadata. At step 380, upon receiving the data and associated privacy metadata via the file system, the application can perform different actions based on the data and its associated privacy metadata. At step 385, the application may be allowed to add, upload, post, share, or otherwise use the data. For example, if the associated privacy metadata indicates that the data in the file is not sensitive or private, the application may be free to post the data to a social network. At step 390, the application may be limited in how it adds, uploads, posts, shares, or otherwise uses the data. For example, if the data in the file is sensitive or private, the application may be limited in where it posts the data or with whom the data is shared. At step 395, the application may be prevented from adding, uploading, posting, sharing, or otherwise using the data. For example, if the data in the file is sensitive or private, the application may be prevented from sharing the data in any way.

Particular embodiments may repeat one or more steps of the method of FIGS. 3A and 3B, where appropriate. Although this disclosure describes and illustrates particular steps of the method of FIGS. 3A and 3B as occurring in a particular order, this disclosure contemplates any suitable steps of the method of FIGS. 3A and 3B occurring in any suitable order. Moreover, although this disclosure describes and illustrates an example method for using a file system to maintain privacy of data and files including the particular steps of the method of FIGS. 3A and 3B, this disclosure contemplates any suitable method for using a file system to write and retrieve files to and from a storage device including any suitable steps, which may include all, some, or none of the steps of the method of FIGS. 3A and 3B, where appropriate. Furthermore, although this disclosure describes and illustrates particular components, devices, or systems carrying out particular steps of the method of FIGS. 3A and 3B, this disclosure contemplates any suitable combination of any suitable components, devices, or systems carrying out any suitable steps of the method of FIGS. 3A and 3B.

System Overview

Figure 4:
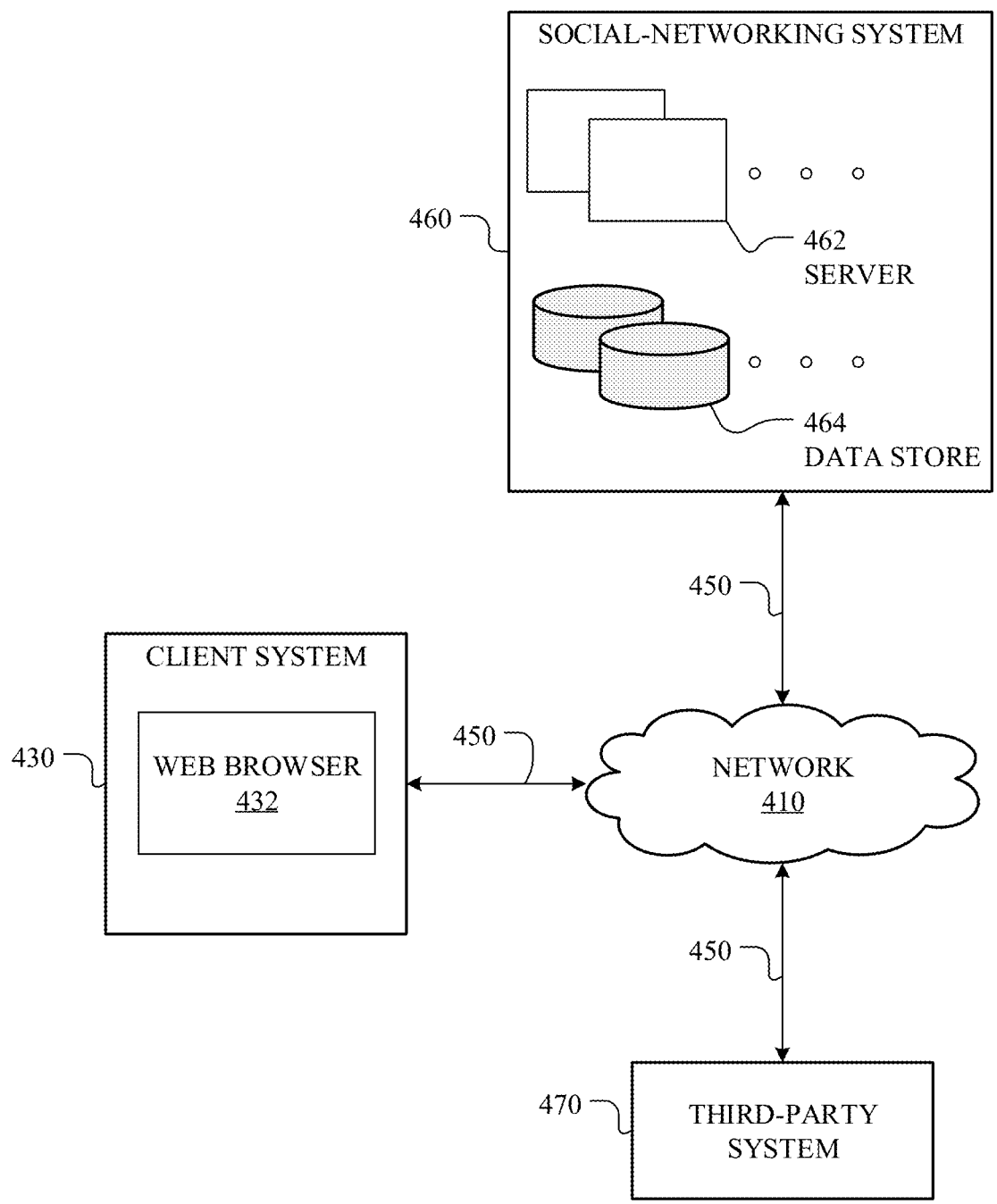
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, and may have one or more add-ons, plug-ins, or other extensions. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Social Graphs

Figure 5:
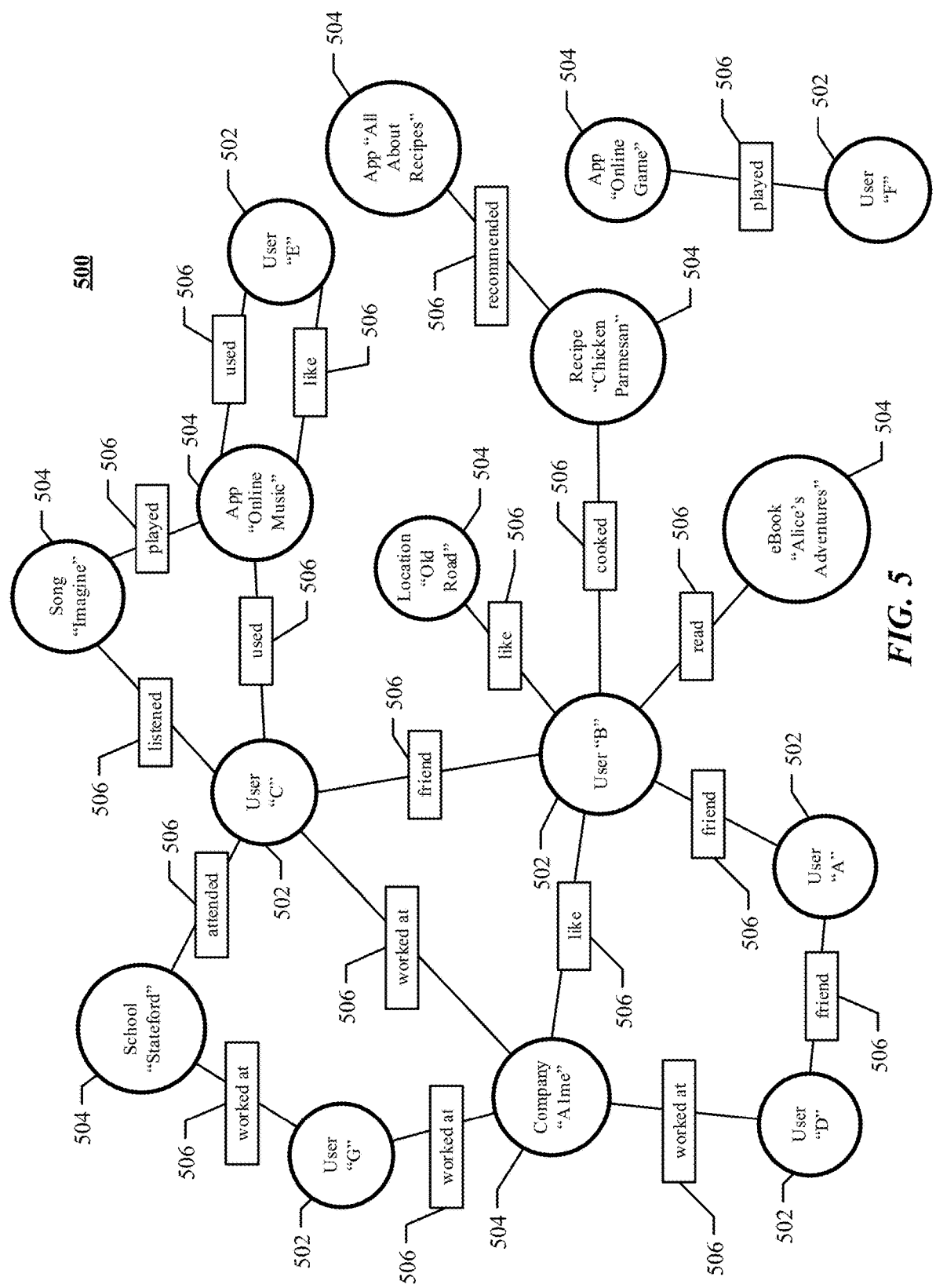
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Each node may be associated with a unique entity (i.e., user or concept), each of which may have a unique identifier (ID), such as a unique number or username. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506. The degree of separation between two objects represented by two nodes, respectively, is a count of edges in a shortest path connecting the two nodes in the social graph 500. As an example and not by way of limitation, in the social graph 500, the user node 502 of user "C" is connected to the user node 502 of user "A" via multiple paths including, for example, a first path directly passing through the user node 502 of user "B," a second path passing through the concept node 504 of company "A1me" and the user node 502 of user "D," and a third path passing through the user nodes 502 and concept nodes 504 representing school "Stateford," user "G," company "A1me," and user "D." User "C" and user "A" have a degree of separation of two because the shortest path connecting their corresponding nodes (i.e., the first path) includes two edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played,"

"listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (a third-party online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (the third-party online music application) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "online music application").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 504 corresponding to a particular photo may have a privacy setting specifying that the photo may only be accessed by users tagged in the photo and their friends. In particular embodiments, privacy settings may allow users to opt in or opt out of having their actions logged by social-networking system 460 or shared with other systems (e.g., third-party system 470). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 470, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 462 may be authorization/privacy servers for enforcing privacy settings. In response to a request from a user (or other entity) for a particular object stored in a data store 464, social-networking system 460 may send a request to the data store 464 for the object. The request may identify the user associated with the request and may only be sent to the user (or a client system 430 of the user) if the authorization server determines that the user is authorized to access the object based on the privacy settings associated with the object. If the requesting user is not authorized to access the object, the authorization server may prevent the requested object from being retrieved from the data store 464, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 6:
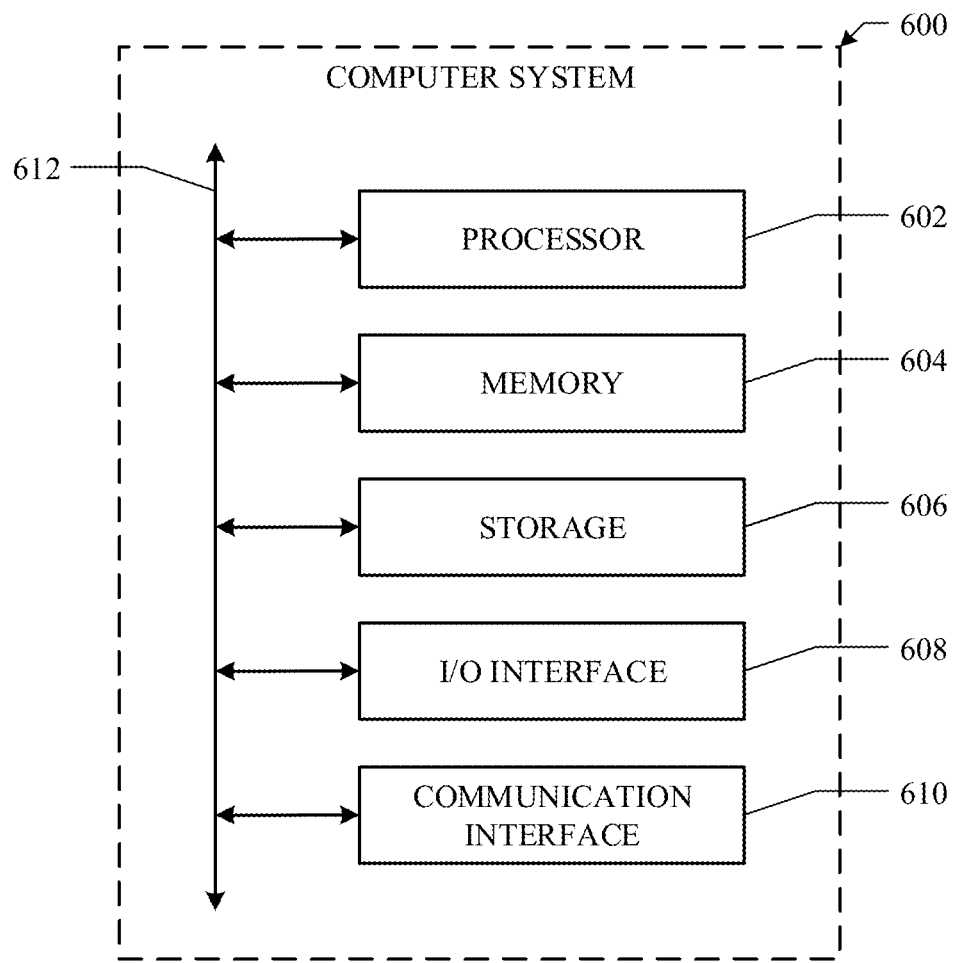
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a file system of a computing device:
    receiving, at the file system, from a first application executing on the computing device, a write request to write a file to a storage device of the computing device, the request comprising a privacy preference for the file, wherein the privacy preference is automatically determined based on a context in which the file was created;
    in response to the write request:
        generating privacy metadata corresponding to the privacy preference;
        associating the privacy metadata to the file; and
        writing the file and the associated privacy metadata to the storage device;
    receiving, at the file system, from a second application executing on the computing device, a read request to read the file from the storage device; and
    in response to the read request, providing by the file system the second application access to the file and the associated privacy metadata;
    wherein the privacy metadata is configured to be used by the second application to select a distribution policy for the file.

2. The method of claim 1, further comprising:
    determining, by the file system, the privacy preference satisfies a predetermined criterion; and
    encrypting the file in response to the determination that the privacy preference satisfies the predetermined criterion.

3. The method of claim 2, wherein the file is encrypted by the file system.

4. The method of claim 1, wherein the privacy preference is selected from a set of privacy preferences defined by the file system.

5. The method of claim 4, wherein the privacy preference is selected by a user of the computing device.

6. The method of claim 1, wherein the distribution policy determines whether the file is allowed to be sent by the second application to another device.

7. The method of claim 6, wherein the distribution policy further determines one or more groups of users with which the file is allowed to be shared.

8. The method of claim 7, wherein the one or more groups of users are selected by a user of the computing device.

9. The method of claim 1, wherein the received privacy preference is determined based on a determination of whether the file contains data that satisfies one or more privacy criteria.

10. The method of claim 9, wherein the determination of whether the file contains data that satisfies the one or more privacy criteria is based on the context in which the file was created.

11. The method of claim 10, wherein the context in which the file was created comprises an interaction between a user and the computing device.

12. The method of claim 10, wherein the context in which the file was created comprises a detected action of a user of the computing device.

13. The method of claim 10, wherein the context in which the file was created is determined based on audio or image recordings of a surrounding of a user of the computing device.

14. The method of claim 10, wherein the context in which the file was created is determined based on a location of a user of the computing device.

15. One or more computer-readable non-transitory storage media embodying software that is operable when executed to:
    receive, at a file system, from a first application executing on a computing device, a write request to write a file to a storage device of the computing device, the request comprising a privacy preference for the file, wherein the privacy preference is automatically determined based on a context in which the file was created;
    in response to the write request:
        generate privacy metadata corresponding to the privacy preference;
        associate the privacy metadata to the file; and
        write the file and the associated privacy metadata to the storage device;
    receive, at the file system, from a second application executing on the computing device, a read request to read the file from the storage device; and
    in response to the read request, provide by the file system the second application access to the file and the associated privacy metadata;
    wherein the privacy metadata is configured to be used by the second application to select a distribution policy for the file.

16. A system comprising:
    one or more processors; and
    one or more computer-readable non-transitory storage media coupled to one or more of the processors and comprising instructions operable when executed by one or more of the processors to cause the system to:
    receive, at a file system, from a first application executing on a computing device, a write request to write a file to a storage device of the computing device, the request comprising a privacy preference for the file, wherein the privacy preference is automatically determined based on a context in which the file was created;
    in response to the write request:
        generate privacy metadata corresponding to the privacy preference;
        associate the privacy metadata to the file; and
        write the file and the associated privacy metadata to the storage device;
    receive, at the file system, from a second application executing on the computing device, a read request to read the file from the storage device; and
    in response to the read request, provide by the file system the second application access to the file and the associated privacy metadata;

wherein the privacy metadata is configured to be used by the second application to select a distribution policy for the file.

* * * * *